INVENTOR
JOSEPH O. PREISIG
BY William H. Meagher
ATTORNEY

INVENTOR
JOSEPH O. PREISIG
BY William H. Meagher
ATTORNEY 3,432,718
TELEVISION FOCUS VOLTAGE SUPPLY
Joseph O. Preisig, Trenton, N.J., assignor to Radio Corporation of America, a corporation of Delaware
Filed Oct. 19, 1967, Ser. No. 676,398
U.S. Cl. 315—22 8 Claims
Int. Cl. H01j 29/70, 29/56

ABSTRACT OF THE DISCLOSURE

A focus voltage supply for use in connection with a cathode ray tube display system. Focus and ultor electrode supply voltages produced by means of peak rectifiers coupled to a deflection transformer are caused to "track" by rendering the focus supply responsive to variations in the amplitude of the second half of deflection flyback pulses.

This invention relates generally to voltage supplies and more particularly to a voltage supply suitable for satisfying the focus voltage requirements of a cathode ray tube.

One application of such a focus voltage supply which is of particular interest is a shadow-mask type of color kinescope. The various aspects of the present invention, therefore, will be described in connection with such a display device as it is used in a color television receiver.

In the design of color television receivers, it is a customary practice to develop both the focus and final anode (ultor) supply voltages by rectification of flyback pulses produced in the horizontal deflection output transformer. When the load current associated with the output transformer is permitted to vary as the kinescope beam current associated with the ultor voltage supply varies, the focus supply voltage also varies and, in some instances the focus supply voltage varies in an opposite sense as compared to ultor voltage variations. As a result, defocusing of the electron beams in the kinescope and a consequent degradation in the quality of the reproduced image is realized.

In accordance with the present invention, a focus voltage supply associated with a horizontal output transformer is provided with means for causing the focus voltage to vary in the same sense as the ultor supply voltage.

In accordance with a particular embodiment of the invention, such results may be achieved by delaying conduction of the focus rectifier until the latter half of the flyback pulse, the relative amplitude of such latter half being representative of the loading on the ultor voltage supply. Specifically, the focus rectifier is supplied with the combination of a flyback pulse and a further waveform selected to inhibit conduction of the rectifier during the first half of retrace and to enhance conduction during the second half thereof. The focus voltage will therefore respond in the desired manner to variations in kinescope beam current such that focus and ultor voltages will "track."

The novel features that are considered characteristic of this invention are set forth with particularity in the appended claims. The invention itself, however, both as to its organization and method of operation as well as additional objects thereof will best be understood from the following description when read in connection with the accompanying drawing in which:

FIGURE 3 is a diagrammatic representation of one practical means of providing the circuit components shown in FIGURE 1.

Figure 1:
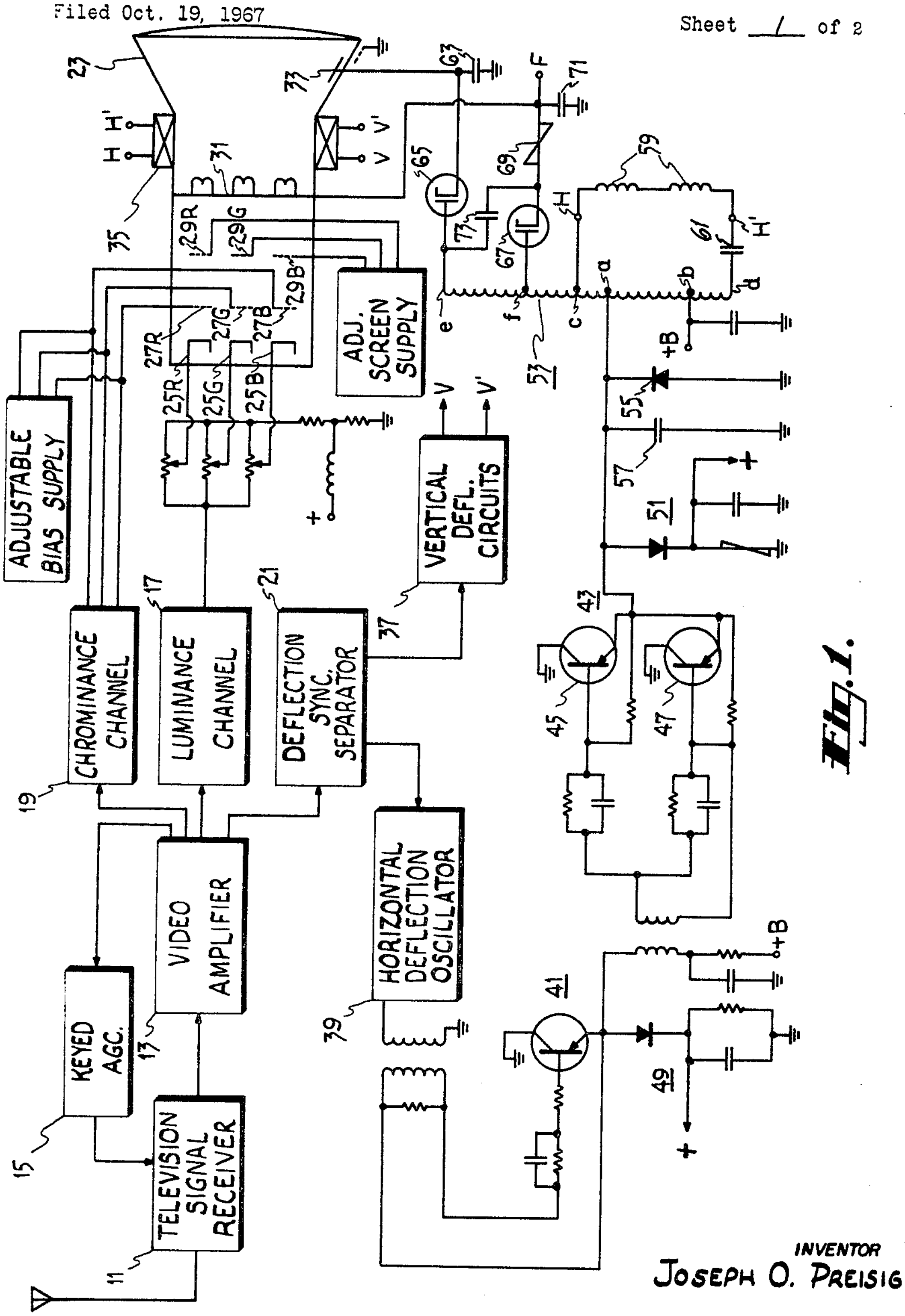
FIGURE 1 is a schematic circuit diagram in block and schematic form of a color television receiver including a focus supply constructed in accordance with the present invention.

In FIGURE 1, a color television receiver which may be of a known type is illustrated mainly in block form, with, however, details of the horizontal output circuitry and associated voltage supplies shown schematically. In the receiver, carrier waves modulated by a composite color television signal are received by conventional signal receiving apparatus 11, which may include the usual RF tuner, frequency converting apparatus, IF amplifier and video detector. The video frequency signals recovered from the modulated carrier in the receiving apparatus 11 are amplified in the video amplifier 13, and supplied to a keyed AGC circuit 15 (operating to control amplifier gain in the signal receiving apparatus 11 in accordance with known automatic gain control principles), to a luminance channel 17, to a chrominance channel 19 and to deflection synchronizing signal separator apparatus 21. The chrominance channel 19 typically comprises a bandpass amplifier for selectively supplying the modulated color subcarrier component of the composite signal, color demodulation apparatus for synchronously detecting the color subcarrier at appropriate subcarrier phases to recover color difference information, and matrixing apparatus for processing the color difference information to forms suitable for application to a color image reproducer. A three-gun shadow mask color kinescope 23 serves as the color image reproducer of the illustrated receiver. The electrode structure of the color kinescope 23 includes respective red, green and blue cathodes 25R, 25G, and 25B; respective red, green and blue control grids 27R, 27G and 27B; respective red, green and blue screen electrodes 29R, 29G and 29B (also known as first or accelerating anodes); a focusing electrode structure 31 and an ultor electrode (or final anode) 33. The target assembly of the color kinescope 23 comprises a phosphor screen composed of a regular array of red-, green- and blue-emitting phosphor dots and an associated perforated mask.

Associated with the color kinescope 23 is a deflection yoke 35, responding to respective vertical and horizontal deflection waves to cause the color kinescope beams to trace a raster on the phosphor screen. A convergence yoke (not shown) responding to suitable dynamic convergence waveforms to cause the color kinescope beams to properly converge in the target region throughout the scanning of the raster is also customarily associated with kinescope 23.

The color difference signal outputs of the chrominance channel 19 are applied individually to the respective control grids 27R, 27G and 27B of the kinescope 23. The respective cathodes 25R, 25G and 25B are driven in common by the output of the luminance channel 17, which serves to amplify the luminance component of the composite signal and includes suitable delay apparatus (not shown) to equalize the delay of the luminance component with the delay of the chrominance information in the chrominance channel 19.

The output of the sync separator 21 is supplied to the vertical deflection circuits 37 and to the horizontal deflection oscillator 39. The vertical deflection circuits 37 generate a vertical deflection wave for application to the terminals V, V′ of the deflection yoke 35, under the control of vertical synchronizing pulses derived from the sync separator apparatus 21. The horizontal oscillator 39, which may be a conventional blocking oscillator, develops a periodic switching voltage under the control of horizontal synchronizing pulses derived from the sync separator apparatus 21. The oscillator 39 is associated with suitable deflection AFC apparatus (not shown) for assuring the desired synchronization.

The periodic switching voltage developed by oscillator 39 is applied to a horizontal driver stage 41, the amplified output of which is applied, in turn, to a horizontal output stage 43. Stages 41 and 43 are illustrated as utilizing transistors but, insofar as the present invention is concerned, other types of semiconductor or vacuum tube devices also may be employed. It is sufficient to note for understanding the present invention that the parallel connected transistors 45 and 47 in output stage 43 are rendered conductive at least during the second half of the trace portion of each deflection cycle and are rendered nonconductive throughout the remainder of the trace portion and throughout the entire retrace portion of each horizontal deflection cycle.

Combined protection and auxiliary voltage supply circuits 49 and 51 are associated respectively with the output (emitter) electrodes of stages 41 and 43. A substantially sawtooth current waveform produced in output stage 43 is supplied to a horizontal output (flyback) transformer 53 including a plurality of windings arranged in an autotransformer configuration. Operating voltage is supplied for output stage 43 by means of a direct voltage supply (+B) coupled to the emitter electrodes of transistors 45 and 47 via the primary winding of transformer 53 (i.e., the winding portion between terminals *a* and *b*). A damper diode 55 and a retrace tuning capacitor 57 are coupled between terminal *a* and a point of reference voltage (ground). The horizontal windings 59 of deflection yoke 35 are coupled by means of a blocking capacitor 61 across the secondary winding (i.e., between terminals *c* and *d*) of transformer 53.

Ultor electrode voltage is developed across a capacitance 63 by means of a high voltage rectifier 65 coupled at terminal *e* to a step-up tertiary winding of transformer 53.

A focus voltage supply constructed in accordance with the present invention comprises a focus rectifier 67 having a first (anode) electrode coupled to terminal *f* of transformer 53 and a second (cathode) electrode coupled by means of a voltage dependent resistor 69 to a focus voltage supply capacitor 71. The voltage developed across capacitor 71 (i.e., at terminal F) is supplied to focus electrode 31 of kinescope 23. Coupling means comprising a capacitor 73 is coupled between high voltage terminal *e* of transformer 53 and the cathode electrode of focus rectifier 67.

Referring to the voltage waveform diagrams shown in FIGURE 2, the operation of the focus voltage supply of FIGURE 1 now will be described. Voltage waveforms which occur during a typical retrace portion of a horizontal deflection cycle are illustrated. It should be recognized that such waveforms recur at the horizontal line scanning rate (e.g., approximately 15,750 cycles per second) and furthermore that the retrace portion of each deflection cycle occupies a minor time portion of each cycle.

Figure 2:
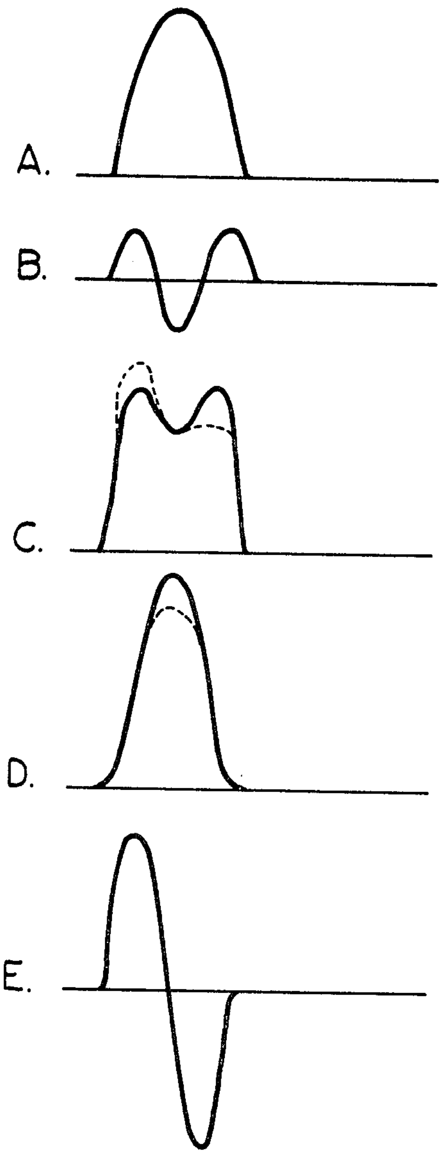
FIGURE 2 is a graph illustrating a series of voltage waveforms (not drawn to scale) which occur during the retrace portion of a horizontal line scanning interval.
Figure 7:
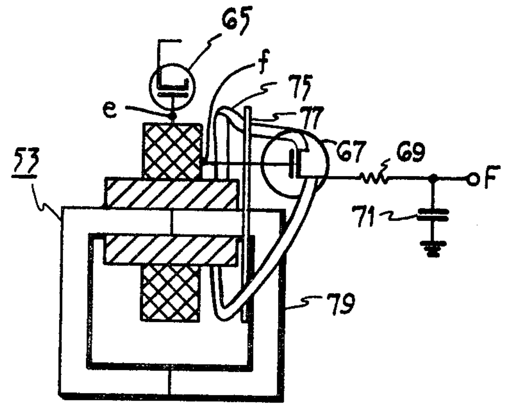

In operation, the voltage waveform appearing during the retrace portion of each horizontal deflection cycle at terminal *a* of transformer 53 includes a fundamental component which is substantially that shown in FIGURE 2, waveform A (i.e., a half-sinusoidal voltage). As is well-known, capacitor 57 is selected with respect to the inductance of deflection windings 59 and additional circuit parameters to provide this waveform. Furthermore, as is customary, the leakage inductance and distributed capacitance of transformer 53 associated with the tertiary high voltage winding is arranged for third harmonic of the retrace interval tuning (i.e., to provide a one and one-half cycle oscillatory voltage waveform across the leakage inductance during horizontal retrace interval—see waveform B). Voltages proportional to those of waveforms A and B add together at terminals *a* and *f* of transformer 53 (see waveform C, solid lines). However, with respect to terminal *e*, the stepped-up version of waveform B (the third harmonic component) is of opposite phase as compared with the third harmonic component at terminals *a* and *f*. As a result, the sum of the stepped-up versions of waveforms A and B which appears at terminal *e* constitutes a sharply peaked high voltage pulse (waveform D, solid lines).

The dotted line portions of waveforms C and D indicate the effect which an increase in kinescope beam current (high voltage load) has on the two voltage waveforms C and D. Typically, the increased beam current load results in an increase in the current supplied by output stage 43 to transformer 53 during the trace portion of the deflection cycle (not illustrated). The additional energy supplied produces an increase in the voltage amplitude across transformer 53 (waveform C) during the first half of the retrace interval (i.e., before the high voltage pulse-waveform D reaches its peak). As waveform D approaches its peak, high voltage rectifier 65 conducts to restore energy to capacitor 63. If the beam current load on capacitor 63 is heavy, and therefore the voltage across capacitor 63 decreases during trace, rectifier 65 commences conduction substantially before waveform D reaches its peak. As a result, more energy is supplied to capacitor 63 (i.e., greater charge supplied to restore voltage) and less energy is returned to transformer 53 during the second half of retrace than in the case of a smaller beam current load. The effect is seen on the second peak of waveform C as indicated by dotted lines. Since focus rectifier 67 and capacitor 71 also constitute a peak rectifier circuit, in the absence of compensating means according to the present invention, the focus voltage, which is related to the amplitude of the first peak of waveform C, would increase relatively with respect to high voltage. De-focusing of the electron beams in kinescope 23 would result.

In accordance with the present invention, means are provided for rendering focus rectifier 27 responsive to variations in the amplitude of the second half of the applied "saddle-shaped" flyback pulse so as to provide tracking of focus and high voltage.

Specifically, capacitor 63 and resistor 69 are employed to provide at the cathode electrode of focus rectifier 67 a differentiated version of the voltage waveform D which appears at terminal *e*. The waveform supplied by capacitor 73 and resistor 69 (see waveform E, FIGURE 2) is arranged to inhibit conduction of rectifier 67 during the first peak of waveform C and to enhance conduction during the second peak of waveform C. That is, the combined effect of applying waveform C at the anode of rectifier 67 and of applying waveform E at the cathode of rectifier 67 renders the focus voltage responsive to the amplitude of that portion of the flyback pulse which is representative of high voltage loading.

Referring to FIGURE 3, a practical means of obtaining the capacitance coupling means 73 is illustrated. This arrangement contemplates use of a focus rectifier 67 which is provided with a directly heated cathode. In that case, a single turn heater winding 75 is physically mounted on transformer 53 in close physical proximity to the tertiary high voltage winding to obtain the necessary differentiating capacitance. An insulative retainer 77 also may be provided on the core 79 of transformer 53 to maintain the desired spacing (and capacitance).

Figure 4:
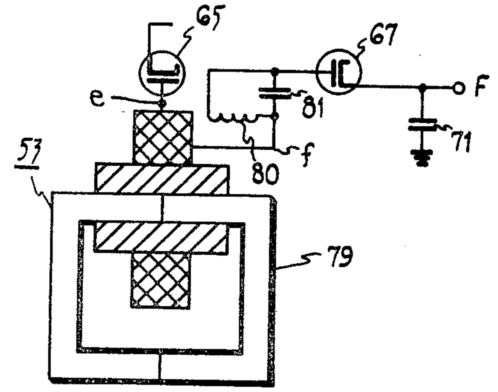
FIGURE 4 is a diagrammatic representation of a modification of the apparatus shown in FIGURE 3.

Referring to FIGURE 4, a further embodiment of the invention is illustrated. In FIGURE 4, a tuned circuit comprising the parallel combination of an inductance 80 and a capacitance 81 is coupled in circuit with focus rectifier 67. The inductance 80 is mounted in the vicinity of the high voltage winding (i.e.,, the portion between terminals *e* and *f*) such that the stray field from that winding induces a ringing voltage in inductance 80. Inductance 80 and capacitance 81 are selected to provide an oscillatory wave of a frequency and phase such as to enhance conduction during the second peak of waveform C and to inhibit conduction during the first peak thereof (e.g., of the order of the fourth or sixth harmonic of the retrace frequency). In a given receiver design, the particular frequency would be determined by observance of the waveform produced across the tuned circuit 80, 81. It should be noted that such waveform is not a simple waveform since at least two phase-shifted components add together to make up the waveform across circuit 80, 81. That is, one component of this waveform is produced by a current which traverses transformer 53 at the beginning of retrace and a second phase-shifted component is produced by the current supplied to charge capacitor 63 via rectifier 65 which current commences in the vicinity of the first peak of waveform C, FIGURE 2. The summation of the two components has the effect of delaying the latter half of the waveform produced across circuit 80, 81.

What is claimed is:

1. In a cathode ray tube system, a voltage supply comprising a deflection output transformer for supplying a deflection current having recurring trace and retrace portions, said transformer further producing recurring retrace voltage pulses, first rectifying means coupled to said transformer responsive to said retrace voltage pulses for developing a unidirectional voltage, and circuit means coupled to said rectifying means for inhibiting conduction within the first half of each said retrace portion and for enhancing conduction within the later half of each of said retrace portion, whereby the amplitude of said unidirectional voltage is determined by the amplitude of the latter half of said retrace voltage pulses.

2. In a cathode ray tube system, a voltage supply according to claim 1 wherein said circuit means comprises wave shaping means coupled to said transformer for providing a voltage waveform of a first polarity within the first half of each said retrace portion and of opposite polarity within the latter half of each said retrace portion.

3. In a cathode ray tube system, a voltage supply according to claim 2 wherein said rectifier means comprises a focus diode and a first capacitor arranged for peak rectification.

4. In a cathode ray tube system, a voltage supply according to claim 3 wherein said transformer is arranged for producing retrace voltage pulses including first and third harmonic components such that a double peaked waveform is produced, said transformer including at least an ultor voltage supply terminal and a focus voltage supply terminal.

5. In a cathode ray tube system, a voltage supply according to claim 4 wherein said wave shaping means comprises a differentiating circuit coupled between said ultor voltage supply terminal and said focus diode.

6. In a cathode ray tube system, a voltage supply according to claim 5 wherein said differentiating circuit comprises a second capacitor and a voltage dependent resistor coupled in the named order between said ultor voltage supply terminal and said first capacitor, the junction of said second capacitor and said resistor being coupled to a first electrode of said focus diode and said focus voltage supply terminal of said transformer being coupled to a second electrode of said focus diode.

7. In a cathode ray tube system, a voltage supply according to claim 4 wherein said wave shaping means comprises a parallel connected resonant circuit coupled in circuit with said focus diode and inductively coupled to the portion of said transformer between said focus and ultor voltage supply terminals.

8. A focus voltage supply for a cathode ray tube comprising a deflection output transformer for supplying a deflection current having recurring trace and retrace intervals, said transformer further having a high voltage winding tuned to the third harmonic of the retrace interval, a high voltage rectifier circuit coupled to said high voltage winding to rectify retrace interval voltage pulses and produce a high voltage for said cathode ray tube, a focus voltage rectifier circuit coupled to said deflection output transformer at a point where the deflection retrace interval voltage wave combines with the high voltage winding third harmonic wave to produce a resultant saddle-shaped wave, and means coupling additional wave energy from said high voltage winding to said focus voltage rectifier circuit to enhance the rectification of said saddle-shaped wave by said focus rectifier circuit during the latter portion of said saddle-shaped wave relative to the initial portion thereof.

References Cited

UNITED STATES PATENTS 2,879,447 3/1959 Preisig .............. 315—22

RODNEY D. BENNETT, *Primary Examiner.*

T. H. TUBBESING, *Assistant Examiner.*

U.S. Cl. X.R.

315—31